US005131310A

United States Patent [19]

Kunimoto

[11] Patent Number: 5,131,310

[45] Date of Patent: Jul. 21, 1992

[54] MUSICAL TONE SYNTHESIZING APPARATUS

[75] Inventor: Toshifumi Kunimoto, Hamamatsu, Japan

[73] Assignee: Yamaha Corporation, Hamamatsu, Japan

[21] Appl. No.: 552,985

[22] Filed: Jul. 16, 1990

[30] Foreign Application Priority Data

Jul. 18, 1989 [JP] Japan .................................. 1-185198

[51] Int. Cl.[5] .............................................. G01D 00/00

[52] U.S. Cl. .......................................... 84/604; 84/622; 84/625; 84/630; 84/660; 84/661; 84/699; 84/DIG. 9; 84/DIG. 10

[58] Field of Search .......... 84/622, 624, 625, 659-661, 84/692, 694-696, 699, DIG. 9, DIG. 10, 629, 630, 604-607

[56] References Cited

U.S. PATENT DOCUMENTS

| | | | |
|---|---|---|---|
| 4,508,001 | 4/1985 | Suzuki | 84/604 |
| 4,597,318 | 7/1986 | Nikaido et al. | 84/625 |
| 4,815,354 | 3/1989 | Kunimoto | 84/DIG. 9 |
| 4,984,276 | 1/1991 | Smith | 84/630 X |

FOREIGN PATENT DOCUMENTS

| | | |
|---|---|---|
| 58-58679 | 12/1983 | Japan . |
| 63-40199 | 2/1988 | Japan . |

*Primary Examiner*—William M. Shoop, Jr.
*Assistant Examiner*—Brian Sircus
*Attorney, Agent, or Firm*—Graham & James

[57] ABSTRACT

A musical tone synthesizing apparatus is disclosed wherein an excitation signal corresponding to performance data is generated and supplied to a loop circuit. In the loop circuit, this excitation signal is delayed for at least a fixed time period and a repeatedly circulating muscial tone signal is generated. At the beginning of the generation of this musical tone signal, a initial signal with a frequency which corresponds to the pitch of the generated musical tone is supplied. As a result of this, in the loop circuit, resonant operation is carried out quickly in accordance with the initial signal.

7 Claims, 2 Drawing Sheets

NONLINEAR FUNCTION A

MUSICAL TONE SYNTHESIZING APPARATUS

BACKGROUND OF THE INVENTION

1. Field of the Invention

The present invention relates to a musical tone synthesizing apparatus which generates musical tones which ar based on the tone generation mechanism of an acoustic musical instrument.

2. Prior Art

Conventionally, methods of synthesizing the musical tones of an acoustic musical instrument by making a model of the tone generation mechanism of the instrument and simulating this are known. This type of art was disclosed in, for example, Japanese Patent Application, Laid-open publication No. 63-40199, and Japanese Patent Application, second publication, No. 58-58679.

FIG. 2 shows the construction of a musical tone synthesizing apparatus which simulates the tone generation mechanism of a wind instrument as an example of this type of art. In FIG. 2, ROM (Read Only Memory) 11, adder 12, subtracter 13, and multipliers 14 and 15 are shown. These component elements 11-15 comprise excitation circuit 10. This excitation circuit 10 simulates the operation of the mouthpiece and the reed in a wind instrument such as a clarinet or the like.

Bi-directional transmission circuit 20 simulates the transmission characteristics of the resonance tube in the body of a wind instrument. This bi-directional transmission circuit 20 comprises delay circuits D, D . . . , which simulate the propagation delay of the air pressure waves in the resonance tube, junctions JU, JU . . . , which are inserted between these delay circuits, low pass filter LPF, which simulates the loss, etc., of energy at the time of the reflection of the air pressure waves at the end of the resonance tube, and high pass filter HPF, which obstructs the direct current component of the data transmitted within bi-directional transmission circuit 20.

Junctions JU, JU . . . simulate the dispersion of the air pressure waves generated at the points where the diameter of the resonance pipe changes. The junctions JU, JU . . . shown in FIG. 2 use a 4-multiplication lattice comprising multipliers $M_1$-$M_4$ and adder $A_1$ and $A_2$. The symbols "1+k", "−k", "1−k", and "k" which are attached to the multipliers $M_1$-$M_4$ are coefficients of multiplication. The value of k in these coefficients of multiplication is so set that transmission characteristics which are almost equivalent to those in an actual resonance tube are obtained.

With the above described construction, the data P which correspond to the pressure which the player puts into the wind instrument are inputted into the adder 12 and the subtracter 13. Furthermore, the data outputted by adder 12 are transmitted within bi-directional transmission circuit 20 in the following manner: delay circuit D→ junction JU→ delay circuit D→ . . . , and reach low pass filter LPF. Next, after passing through low pass filter LPF and high pass filter HPF, the data are transmitted in the opposite direction from the above, from delay circuit D→ junction JU → . . . , are outputted from bi-directional transmission circuit 20 and are inputted into subtracter 13. It is here that the data outputted by bi-directional transmission circuit 20 are made to correspond to the pressure of the air pressure waves which return from the end of the resonance tube in a wind instrument to the space between the reed and the mouthpiece.

Next, subtracter 13 subtracts data P from the data outputted by bi-directional transmission circuit 20. By means of this subtraction, data $P_1$, which correspond to the air pressure in the gap between the reed and the mouthpiece, are obtained. The data $P_1$ are supplied to ROM 11. ROM 11 outputs data Y, which represent the cross-section of the gap between the reed and the mouthpiece corresponding to data Pl: or which, in other words, correspond to the admittance with respect to the flow of air.

FIG. 3 shows an example of a nonlinear function A which is stored in ROM 11. This nonlinear function A shows the cross-section (output) of the gap between a reed and a mouthpiece corresponding to the air pressure (input) within the gap between the reed and the mouthpiece. Furthermore, data Y, which are outputted from ROM 11, and data $P_1$ are multiplied by means of multiplier 14. By means of this, the data FL, which correspond to the flow velocity of the air which passes through the space between the reed and the mouthpiece are obtained.

The data FL are multiplied by coefficient of multiplication G by means of multiplier 15. This coefficient of multiplication G is a constant determined in correspondence with the tube diameter in the vicinity of the place where the reed is attached in the wind instrument, and corresponds to the resistance to the air flow, in other words, to the impedance with respect to the air flow. Accordingly, the product of the flow velocity of the air flow which passes through the space between the mouthpiece and the reed and the impedance with regard to the air flow in the tube, in other words, the data P2 which correspond to the component of the change in pressure within the tube which is caused by the air flow passing through the space, is outputted by multiplier 15. Furthermore, these data P2 and data P are added by means of adder 12 and are inputted into bi-directional transmission circuit 20.

In this way, data circulate in the closed loop formed by excitation circuit 10 and bi-directional transmission circuit 20, and resonant operation is achieved. In addition, data are retrieved from the point of connection of the low pass filter LPF of the bi-directional transmission circuit 20 which is in resonant operation, and based on these data musical tones are generated.

However, in the conventional musical tone synthesizing apparatus described above, the amount of time from the input of data P to the stabilization of the resonant operation in the closed loop may be large. In this case, there is a problem in that it takes a great deal of time before a stable musical tone signal can be obtained.

Furthermore, in the loop circuit formed by excitation circuit 10 and bi-directional transmission circuit 20, the resonance characteristics have a number of differing resonance frequencies. If there is no profitable difference in these resonance frequencies, it is unclear at which resonance frequency resonance should be achieved, and it becomes difficult to cause resonance at the desired resonance frequency. Accordingly, in this case, there a problem in that it may not be possible to obtain the musical tone of a desired tone pitch.

SUMMARY OF THE INVENTION

It is accordingly an object of the present invention to provide a musical tone synthesizing apparatus which makes possible the conduction of musical tone synthesis based on the actual tone generation mechanism of an acoustic musical instrument and also making possible the swift, with respect to the beginning of musical tone operation, and certain generation of musical tones.

Accordingly, the present invention is a musical tone synthesizing apparatus possessing excitation means for generating an excitation signal based on performance data, a loop circuit including at least delay means provided with a predetermined delay time, said excitation signal being supplied to and repeatedly circulating through said loop circuit so that a musical tone signal is outputted from said loop circuit means, and initial signal generation means for generating an initial signal having a frequency which corresponds to a tone pitch of said musical tone signal, wherein said initial signal is supplied to said loop circuit when beginning generation of said musical tone signal.

With the above described construction, at the time of the beginning of the generation of a musical tone, an initial signal with a frequency which corresponds to the tone pitch of the musical tone is introduced into the loop circuit, and is circulated in the loop circuit. Accordingly, in the loop circuit, swift harmonic operation according to the initial signal is carried out.

DETAILED DESCRIPTION OF THE PREFERRED EMBODIMENTS

Figure 1:
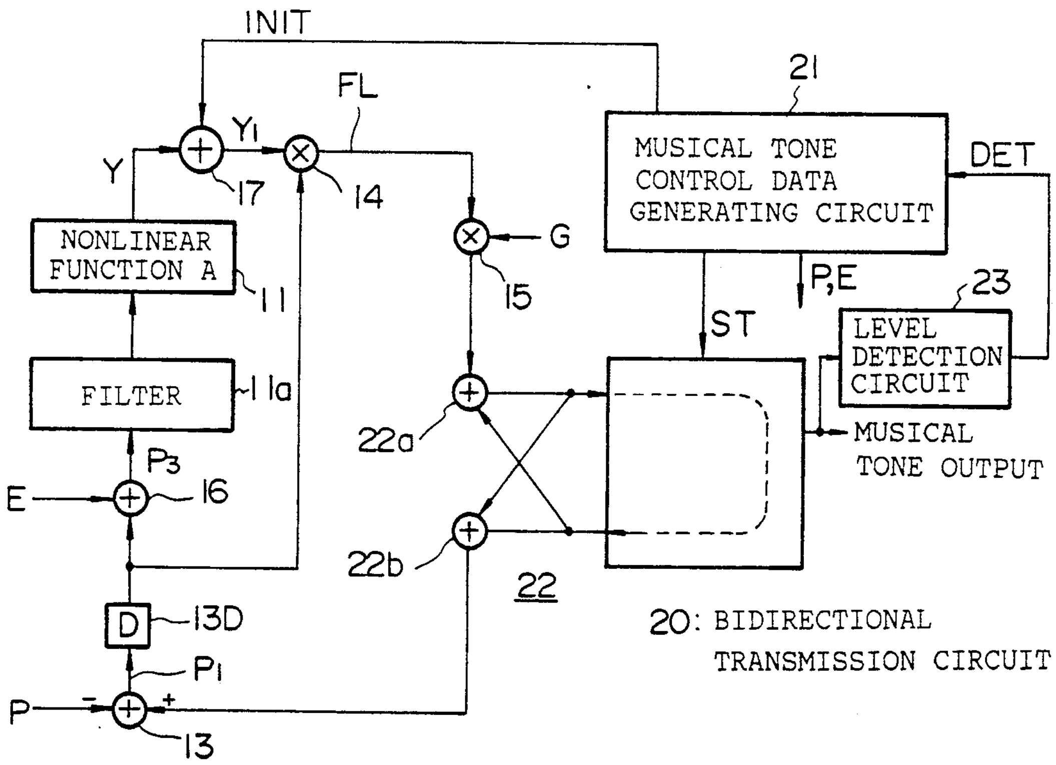
FIG. 1 is a block diagram showing the construction of a musical tone synthesizing apparatus according to a preferred embodiment of the invention.
Figure 2:
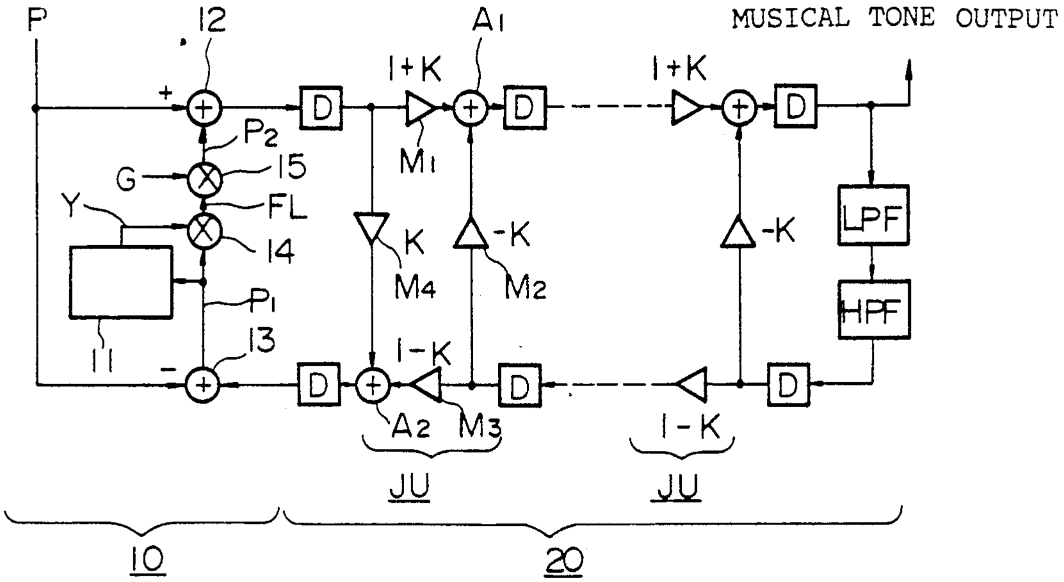
FIG. 2 is a block diagram showing the construction of a conventional musical tone synthesizing apparatus.
Figure 3:
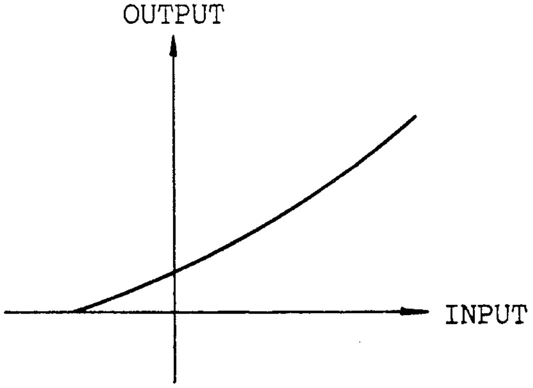
FIG. 3 is for the purpose of explaining the nonlinear function A which is stored in ROM 11, which appears in FIGS. 1 and 2.

The first preferred embodiment of the present invention will herein be explained with reference to the diagrams. FIG. 1 is a block diagram showing the construction of a musical tone synthesizing apparatus according to the first preferred embodiment of this invention. In this diagram, the components which correspond to those in the above-described FIG. 2 are marked in an identical fashion.

In musical tone control data generating circuit 21, the operation of the various manually operable members (not shown in the diagram) with which the main part of the musical tone synthesizing apparatus is equipped is detected, and according to the operation thus detected various musical tone control data are generated. Data P, which correspond to the pressure put into the instrument by the player, data E, which correspond to the pressure placed on the reed when the player places the mouthpiece of a wind instrument into his mouth (this pressure is called embouchure), and data ST, which control the pitch of the generated musical tones, are outputted as the musical tone control data.

Data ST, which are used for the control of the tone pitch, change the delay time of the signal transmission which occurs in bi-directional transmission circuit 20. As a result of this, the resonance frequency in bi-directional transmission circuit 20 is changed, and the tone pitch is controlled.

Junction 22 comprises adders 22*a* and 22*b*. In this junction 22, the data outputted by multiplier 15 and bi-directional transmission circuit 20 are added by means of adder 22*a* and are inputted into bi-directional transmission circuit 20. Furthermore, the data outputted by bi-directional transmission circuit 20 and adder 22*a* are added by means of adder 22*b* and are outputted to subtracter 13. In this way, the dispersion of the air pressure waves at the mouthpiece end of the resonance tube is simulated.

As in the case of the above-described FIG. 2, data P, which correspond to the pressure put into the instrument by the player, are inputted into subtracter 13, and the return data which are outputted by bi-directional transmission circuit 20 (these data correspond to the air pressure waves which are reflected at the far end of the resonance tube and return to the mouthpiece end) are also inputted through the medium of adder 22*b* of junction 20. Next, data $P_1$, which correspond to the air pressure in the gap between the mouthpiece and the reed, are outputted from subtracter 13, and these data $P_1$ are inputted into adder 16 and multiplier 14 through the medium of delay circuit 13D.

Data E, which correspond to the embouchure, are added to data $P_1$ in an offset manner in adder 16. As a result of this, data $P_3$, which correspond to the pressure which is actually placed on the reed, are outputted from adder 16. These data $P_3$ are attenuated in band by filter inputted into ROM 11.

Here the reasons for the insertion of filter 11*a* will be given. In the case in which the pressure on the reed is changed, as the reed itself has inertia, etc., the reed is slow in reacting to this change in pressure. Further, if the frequency of the pressure change is high, the reed does not respond. In order to simulate these types of response characteristics of the reed in response to changes in pressure, band attenuation is carried out by filter 11*a*. Then, data Y, which correspond to the admittance with regard to air pressure of the space between the mouthpiece and the reed, are outputted from ROM 11.

Next, data Y become data $Y_1$ through the medium of adder 17 and are inputted into multiplier 14. Here. at the beginning of musical tone generation, the initial data INIT are supplied to adder 17. These initial data INIT will be discussed later. Further, data $Y_1$ are multiplied by data $P_1$ inputted through the medium of delay circuit 13D, and data FL, which correspond to the velocity of the flow of air passing through the space between the mouthpiece and the reed,re outputted.

Data FL are then multiplied by constant G in multiplier 15. Constant G corresponds, as previously described, to the impedance with respect to the flow of air. By means of this multiplication, data corresponding to the air pressure in the tube are obtained, and these data are inputted into bi-directional transmission circuit 20 by means of adder 22*a* of junction 22. The data outputted from bi-directional transmission circuit 20 are then inputted into adder 13 through the medium of junction 22, and signal processing identical to that described above is repeatedly carried out.

In musical tone control data generating circuit 21, the initial data INIT described above are outputted when musical tone generation is begun. These initial data INIT are the frequency signal corresponding to the pitch of the generated musical tones, converted into the digital data of a time series. Musical tone control data generating circuit 21 repeatedly generates these initial data INIT and supplies them to adder 17. Sine waves or other wave forms generated by commonly known waveform memor reading methods or the like are used for initial data INIT.

With this type of construction, at the beginning of musical tone generation, the circulation of signals within the musical tone synthesizing apparatus is carried out in accordance with initial data INIT. By means of this, resonant operation can be quickly carried out. In addition, when the level of the musical tone output from bi-directional transmission circuit 20 reaches a fixed level, this is determined by the level detection circuit 23, and the level detection signal DET is sent to musical tone control data generating circuit 21. As a result of this, the supply of initial data INIT to musical tone control data generating circuit 21 is stopped. After this, operation in the musical tone synthesizing apparatus is controlled solely by means of data which correspond to the physical values given by an actual wind instrument to data P and E, etc., and the synthesis of musical tone is carried out.

SECOND PREFERRED EMBODIMENT

In the first preferred embodiment described above, initial data INIT were added to ROM 11 output data Y, but in place of this, if initial data INIT are added to the output of delay circuit 13D and this is inputted into multiplier 14, it is possible to obtain the same effects as in the case of the first preferred embodiment.

THIRD PREFERRED EMBODIMENT

Furthermore, in the first preferred embodiment described above, when the musical tone output level was detected the supply of initial data INIT was stopped, but in place of this, it is acceptable to continue the supply of initial data INIT for a fixed time after the beginning of the generation of musical tones. Furthermore, it is acceptable to slowly decrease the initial data INIT in response to the output signal of level detection circuit 23.

What is claimed is:

1. A musical tone synthesizing apparatus comprising:

(a) excitation means for generating an excitation signal based on performance data;

(b) a loop circuit connected to the excitation means and including at least delay means provided with a predetermined delay time, said excitation signal being supplied to and repeatedly circulating through said loop circuit to form a musical tone signal which is outputted from said loop circuit means; and (c) initial signal generation means for generating an initial signal having a frequency which corresponds to a desired tone pitch of said musical tone signal, and supplying said initial signal to said loop circuit.

2. A musical tone synthesizing apparatus in accordance with claim 1, wherein said initial signal is supplied to said loop circuit when beginning the generation of said musical tone signal.

3. A musical tone synthesizing apparatus in accordance with claim 1, wherein said initial signal generation means stops the supply of said initial signal when said musical tone signal reaches a predetermined level.

4. A musical tone synthesizing apparatus in accordance with claim 1, wherein said initial signal generation means outputs said initial signal for a predetermined period of time after the beginning of the generation of said musical tone.

5. A musical tone synthesizing apparatus in accordance with claim 1, wherein said initial generation means gradually reduces the output level of said initial signal in response to the output level of said musical tone signal.

6. A musical tone synthesizing apparatus in accordance with claim 1, wherein said loop circuit includes a nonlinear circuit for generating an output in response to the excitation signal and the signal circulating in the loop circuit in accordance with a non-linear function, wherein said initial signal is added to the output of said non-linear circuit.

7. A musical tone synthesizing apparatus in accordance with claim 1, wherein said loop circuit includes a delay circuit for delaying the signal circulating the loop circuit, wherein said initial signal is added to the output of the delay circuit.

* * * * *